United States Patent
Wei et al.

(10) Patent No.: US 9,862,805 B2
(45) Date of Patent: Jan. 9, 2018

(54) ENGINEERED CROSS-LINKED THERMOPLASTIC PARTICLES FOR INTERLAMINAR TOUGHENING

(71) Applicant: CYTEC TECHNOLOGY CORP., Wilmington, DE (US)

(72) Inventors: Yi Wei, Yorba Linda, CA (US); Alexandre Baidak, Saffron Walden (GB); James Senger, Placentia, CA (US)

(73) Assignee: CYTEC TECHNOLOGY CORP., Wilmington, DE (US)

(*) Notice: Subject to any disclaimer, the term of this patent is extended or adjusted under 35 U.S.C. 154(b) by 358 days.

(21) Appl. No.: 14/469,630

(22) Filed: Aug. 27, 2014

(65) Prior Publication Data
US 2014/0364568 A1 Dec. 11, 2014

Related U.S. Application Data

(62) Division of application No. 12/787,741, filed on May 26, 2010, now Pat. No. 8,846,618.

(60) Provisional application No. 61/287,337, filed on Dec. 17, 2009, provisional application No. 61/182,302, filed on May 29, 2009.

(51) Int. Cl.
| | | |
|---|---|---|
| *C08J 3/24* | (2006.01) | |
| *C08J 3/12* | (2006.01) | |
| *C08G 59/32* | (2006.01) | |
| *C08G 59/50* | (2006.01) | |
| *C08G 73/10* | (2006.01) | |
| *C08L 63/00* | (2006.01) | |
| *C08L 71/12* | (2006.01) | |
| *C08L 79/08* | (2006.01) | |
| *C08L 81/06* | (2006.01) | |

(52) U.S. Cl.
CPC .......... *C08J 3/246* (2013.01); *C08G 59/3227* (2013.01); *C08G 59/5086* (2013.01); *C08G 73/106* (2013.01); *C08J 3/12* (2013.01); *C08L 63/00* (2013.01); *C08L 71/12* (2013.01); *C08L 71/126* (2013.01); *C08L 79/08* (2013.01); *C08L 81/06* (2013.01); *C08J 2300/24* (2013.01); *C08J 2371/12* (2013.01); *C08J 2379/08* (2013.01); *C08J 2409/02* (2013.01); *C08J 2463/00* (2013.01); *C08J 2481/06* (2013.01); *C08L 2205/03* (2013.01); *C08L 2205/22* (2013.01); *C08L 2207/04* (2013.01); *C08L 2312/02* (2013.01); *C08L 2312/04* (2013.01); *Y10T 428/2982* (2015.01)

(58) Field of Classification Search
CPC ............ C08G 59/3227; C08G 59/5086; C08G 73/106; C08L 63/00; C08L 71/12; C08L 71/126; C08L 79/08; C08L 81/06; C08L 81/00; C08J 3/12; C08J 3/246
USPC ........ 525/50, 330.3, 332.5, 333.3, 410, 419, 525/420, 469, 471, 474, 535
See application file for complete search history.

(56) References Cited

U.S. PATENT DOCUMENTS

| | | | | |
|---|---|---|---|---|
| 5,189,116 A | * | 2/1993 | Boyd | C08J 5/24 428/113 |
| 6,531,568 B1 | * | 3/2003 | Shibuya | C08G 73/101 524/600 |
| 7,230,047 B2 | * | 6/2007 | Issari | C08L 101/00 524/500 |
| 2004/0127594 A1 | * | 7/2004 | Yang | C08F 290/061 522/114 |
| 2006/0292375 A1 | * | 12/2006 | Martin | B32B 5/28 428/413 |

* cited by examiner

*Primary Examiner* — Roberto Rabago
(74) *Attorney, Agent, or Firm* — Thi Dang

(57) ABSTRACT

Thermoplastic polymer particles directly cross-linked together or cross-linked via a separate and independent polymer network to form an inter-penetrating network are disclosed herein, along with methods of manufacturing and use as interleaf tougheners of pre-pregs and composite articles.

11 Claims, 4 Drawing Sheets

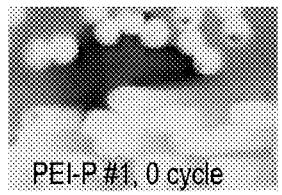 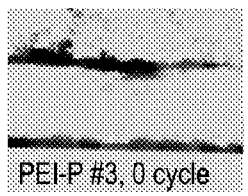 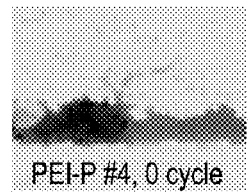 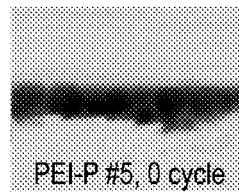
FIG.4A   FIG.4B   FIG.4C   FIG.4D
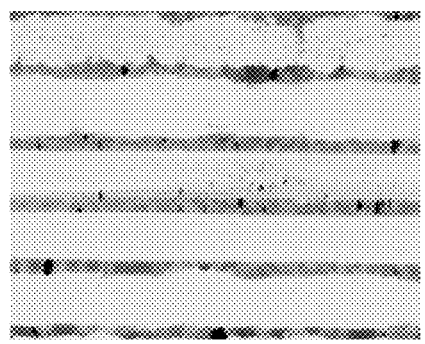
FIG.5A
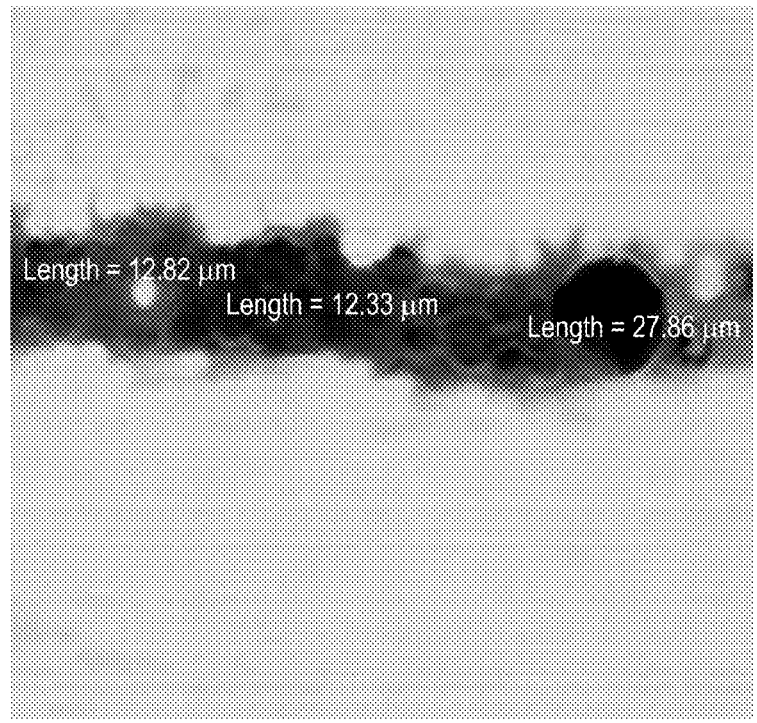
FIG.5B

ENGINEERED CROSS-LINKED THERMOPLASTIC PARTICLES FOR INTERLAMINAR TOUGHENING

CROSS-REFERENCE TO RELATED APPLICATIONS

This application is a divisional application of U.S. application Ser. No. 12/787,741, filed May 26, 2010, now U.S. Pat. No. 8,846,818, which claims priority to U.S. Provisional Application No. 61/182,302, filed May 29, 2009, and to U.S. Provisional Application No. 61/287,337, filed Dec. 17, 2009, each of which is incorporated herein by reference in its entirety.

BACKGROUND OF THE INVENTION

1. Field of the Invention

The invention relates to engineered particles useful for interleaf toughening of composite articles. More specifically, the invention relates to engineered cross-linked particles having a thermoplastic polymer backbone, which particles are insoluble in resin systems and remain discrete particles after curing.

2. Description of the Related Art

Functionalized acrylonitrile-butadiene rubbers have been used for many years to toughen thermoset adhesives and composites; U.S. Pat. Nos. 3,926,904 and 4,500,660. These tougheners have been shown to be soluble inside the uncured thermoset resin, but then phase separate out during cure, generating regions of rubber throughout the body of the matrix.

These rubber particles are also claimed to be cross-linked, possibly by "in-situ" formation by RIPS (resin-induced phase separation) as commonly described. These rubbers were proven effective in regards to toughening, however they generally decreased the hot wet mechanical performance of the composite. This drop in hot wet performance limited rubber's utility in aerospace applications.

Functionalized and non-functionalized thermoplastics, such as polyethersulfones, were also found to increase toughness in composites but without significant loss of hot wet performance; U.S. Pat. No. 4,656,207. These thermoplastics behaved similar to the above mentioned rubbers; dissolving into the uncured resin but phase separating from the resin during cure.

Hirschbuehler et al. U.S. Pat. Nos. 4,539,253; and 4,604,319 showed that by concentrating the toughener between the plies of a composite, a greater increase in toughness could be obtained. This concept was utilized through the insertion of thermoplastic particles, into the resin, that would remain mainly insoluble during prepreg manufacture, but would later dissolve into the resin and then phase separate during cure, U.S. Pat. Nos. 4,954,195; 4957,801; 5,276,106; and 5,434,224. These particles were large enough that they were filtered by the fibers to the interleaf region between the plies. Thus, when particle dissolution occurred, a higher concentration of thermoplastic could be generated in the interleaf region than would be possible through the dissolution of the thermoplastic before prepreg manufacture.

Another approach taken to increase the toughness in the interleaf region was through the insertion of insoluble particles. Numerous patents have been filed by Gawin and others describing the insertion of pre-formed rubber particles; U.S. Pat. Nos. 4,783,506; 4,977,215; 4,977,218; 4,999,238; 5,089,560; and 6,013,730. These particles were again large enough so that they would be filtered away from the fiber bundles into the interleaf region. Also, though they were insoluble they were capable of swelling in the resin. Later technology, U.S. Pat. Nos. 5,266,610; and 6,063,839, used core-shell rubber particles to be used for the same purpose. Likewise, silicone based particles were also developed; U.S. Pat. No. 5,082,891, for toughening purposes.

Insoluble thermoplastic particles were utilized as interleaf tougheners to avoid the loss of hot wet performance as indicated by U.S. Pat. Nos. 4,957,801; 5,087,657; 5,242,748; 5,434,226; 5,605,745; and 6,117,551. However, these insoluble particles are generally made from polymers that do not dissolve or swell in the resin compositions, and are made from precipitation or milling.

Several variations of polyamide/Nylon particles have been explored to enhance the particle's toughening ability. One variation, U.S. Pat. No. 5,028,478, examined the insertion of a crosslinked epoxy-amine network into the particle to increase the particle's solvent resistance. The others, U.S. Pat. Nos. 5,169,710; and 5,268,223, examined the generation of a porous particle that could increase the interaction between the particle and the resin.

Many high Tg thermoplastics, such as nylon or polyetherimide sold under the trademark ULTEM®, are so tough that they cannot be milled/grinded without cryogenic conditions. To effectively make use of these polymers, and polymers of similar kind such as the PPO/PS alloys, a method needs to be established to produce the particles in the usable particle size.

Accordingly, the thermoplastic particles for composite toughening and methods presently available for producing such particles require further improvement. Thermoplastic particles remaining insoluble even after curing, thereby imparting improved toughness, damage tolerance, hot wet performance, processing, micro-cracking resistance, and reduced solvent sensitivity would be a useful advance in the art and could find rapid acceptance in the large commercial transport and/or military aerospace industries, among others.

SUMMARY OF THE INVENTION

The discovery detailed herein provides thermoplastic particles that have primary use as composite interleaf tougheners. The particles remain insoluble in resin systems upon curing, thereby increasing toughness and damage tolerance of composite articles. Composites prepared using such particles show 25% or greater increase in damage tolerance as compared to composites containing a dissolved form of the thermoplastic polymer. Additional characteristics enhanced by use of the thermoplastic particles of this invention in composite articles include reduced solvent sensitivity, improved hot wet properties, improved processing properties for prepregs, and resistance to micro-cracking.

Accordingly, the invention described in detail herein provides, in one aspect, an engineered particle composed of a plurality of polymeric chains having a thermoplastic polymer backbone including one or more thermoplastic polymer and one or more reactive group, and a cross-linking agent such that the cross-linking agent is chemically reactive with the reactive groups and of the polymer, thus directly cross-linking the polymer chains to each other via the reactive groups.

In another aspect, the invention provides an engineered particle composed of a plurality of polymeric chains having a thermoplastic polymer backbone including one or more thermoplastic polymers, and a cross-linking network composed of one or more compounds having one or more reactive group and a cross-linking agent chemically reactive with the reactive groups and capable of polymerizing the compounds via the reactive groups, thereby forming an inter-penetrating polymer network between the polymeric chains and the cross-linking network.

In still another aspect, the invention provides a resin system that includes a thermosetting resin and a plurality of engineered particles according to the present invention. The invention further provides a prepreg that includes the engineered particles and/or resin system according to the invention described in detail herein, and composite article formed therefrom.

The invention also includes methods of manufacturing the engineered particles described herein by dissolving the thermoplastic polymer(s) and cross-linking agent, or, if present the cross-linking network, in a solvent, forming an emulsion by mixing the polymer/solvent mixture with an immiscible solution in the presence of one or more stabilizer, stripping the solvent out of the emulsion to form solid particles, and curing the solid particles thereby cross-linking the polymer chains in the particles, or forming an inter-penetrating polymer network.

In another aspect, the invention provides methods of manufacturing a composite article having increased toughness and damage tolerance by adding a plurality of engineered particles according to the invention to a thermosetting resin system, forming a multiple of prepregs with the resin system, laying up the prepregs to form a shaped article, and curing the article thereby forming a composite article having increased toughness and damage tolerance.

These and other objects, features and advantages of this invention will become apparent from the following detailed description of the various aspects of the invention taken in conjunction with the accompanying Figures and Examples.

BRIEF DESCRIPTION OF THE DRAWINGS

FIGS. 4A-D: Effectiveness of cross-linking as shown by the sol-gel method corresponding to Table 1. Effect of the gel level on how much the particles can retain their shape is demonstrated. When the gel level is 0 (A), the particles completely lose their definition during the cure of the composite. When the gel level increases, the definition of the particles becomes clearer (B-D).

FIGS. 5A-B: Qualitative measurement of microcracking using microscopy with Zyglo fluorescent dye. (A): Microcracking evident with particle prepared with polyphenylene ether (NORYL® 853 available from Sabic-IP) and no gel without thermal cycle; (B) No microcracking with hybrid particle prepared with NORYL® 853 and a polyethersulfone block copolymer (referred herein as KM180) and 21% by weight gel.

FIG. 6A illustrates the behavior of crosslinked compatible particles, and FIG. 6B illustrates that of PPO modified resin. Cracks are only observed on the sample with conventional thermoplastic particles.

DETAILED DESCRIPTION OF CERTAIN EMBODIMENTS OF THE INVENTION

Figure 1A:
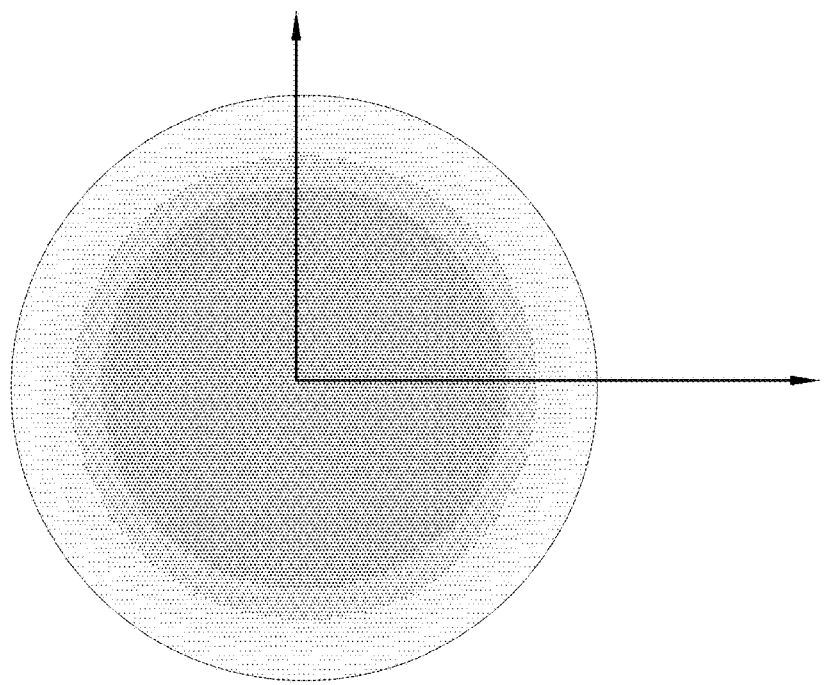
FIGS. 1A-B illustrate the evolution of a particle's properties after the matrix monomers have diffused into a particle. (A): illustrates a higher thermoplastic concentration towards the core of a more highly crosslinked particle, while (B) illustrates a lower thermoplastic concentration in the core of a less highly crosslinked particle.

As summarized above, the discovery provides novel polymeric particles that can be used in the interlaminar resin-rich region of a thermosetting matrix composite to improve mechanical properties such as CAI, $G_{IC}$, $G_{IIC}$, OHC, etc. The particles of the invention are either partially or totally insoluble in the thermosetting resin matrix and remain as discrete particles even after the curing process. The invention provides two approaches to achieve partial or total insolubility of the polymeric particles. One approach includes "tying-up" the soluble polymer molecules via direct cross-linking of the chains using one or more reactive groups. A second approach includes tying-up the soluble polymer molecules via the formation of a separate and independent cross-linking network, thereby creating an inter-penetrating network ("IPN") or semi-IPN. Thus, the thermoplastic polymer particles described herein can be simultaneously thermodynamically compatible with a thermosetting resin such as an epoxy resin and they are chemically cross-linked in order to prevent their dissolution in the resin. Their cross-linking level affects the diffusion of the uncured thermosetting resin into the particles. One advantage includes strong bonding and good stress transfer between the particles and the resin matrix due to generating particles presenting a gradient interphase within the particle to the surrounding resin matrix. Another advantage of the cross-linked particles includes imparting improved resistance to solvents and microcracking of the particles in the composite material. The particles deliver increased toughness compression after impact (CAI), fracture toughness or delamination resistance in mode I and II ($G_{IC}$, $G_{IIC}$) to the composite without impacting the fluid sensitivity properties. An additional benefit of the technology is the ability to tailor the properties of the particles to specific epoxy resin formulations. The particles, compositions comprising the particles, and associated methods and the related advantages will be discussed below in more detail.

Accordingly, in one aspect the invention provides an engineered particle having a plurality of polymeric chains including a thermoplastic polymer backbone that includes one or more thermoplastic polymer and one or more reactive group, and a cross-linking agent that is chemically reactive with the reactive groups such that the cross-linking agent directly cross-links the polymer chains to each other via the reactive groups. Because this approach is based on direct cross-linking of the chains, the reactive groups of the chains cannot be blocked and the chains cannot be otherwise chemically inert (i.e., each chain must have at least one type of reactive group). In certain embodiments, the reactive groups will be terminally located on the chains. In other embodiments, the reactive groups can be located anywhere along the backbone of the chains.

In another aspect, the invention provides an engineered particle having a plurality of polymeric chains including a thermoplastic polymer backbone that includes one or more thermoplastic polymer, and an independent cross-linking network including one or more compounds capable of polymerization via one or more reactive group, wherein the polymeric chains and the cross-linking network together form an inter-penetrating (or semi-interpenetrating) network. Accordingly, because this approach relies on a separate cross-linking network to entangle the polymeric chains the polymeric chains can either have reactive groups or be chemically inert. Thus, in some embodiments of the particles described herein the thermoplastic polymer chains will possess reactive groups (either terminally located or located anywhere along the chain). In other embodiments of the particles of the invention, the thermoplastic polymer chains will have no reactive groups. In still other embodiments of the particles of the invention, the plurality of polymeric chains can have a mix of some chains with reactive groups and some chains without reactive groups.

The term "plurality" as used herein has its ordinary meaning as known to those skilled in the art and includes two or more of the noun being modified. For example, a "plurality of polymeric chains" is understood to mean two or more polymeric chains.

The term "thermoplastic" as used herein has its ordinary meaning as known to those skilled in the art and includes the thermoplastic that comprises the thermoplastic polymer backbone in the engineered cross-linked thermoplastic particles described herein. In some embodiments, the thermoplastic may be one or more of a polycarbonate, polyetherimide (PEI), polyamide, polyimide, polysulfone, poly ether sulfone (PES), poly phenylene oxide (PPO), poly ether ketones, polyphenyl sulfides (PPS), polyhydroxyethers, styrene-butadiene, polyacrylates, polyacetal, polybutylene-terephthalate, polyamide-imide, poly ether ether sulfone (PEES), blends thereof, or a copolymer thereof, such as PES/PEES with various repeat unit ratios, PES homopolymers (such as PES 5003P from Sumitomo or RADEL® PES from Solvay polymers) or PEES homopolymers. One example of a thermoplastic backbone is a PES copolymer, which is an amine terminated PES-PEES thermoplastic, and referred herein as HC99 or KM180. Accordingly, the thermoplastics listed above can be used as single component to form a particle, or, when more than one thermoplastic polymer is used a hybrid structure, or a hybrid particle, is formed. The thermoplastic polymer backbone may also comprise any aromatic polymer, copolymer or oligomer containing amide, sulfone, ketone, imide, ester, ether, biphenyl, sulfide and carbonate linkages and any combination thereof. The thermoplastic backbone may also comprise any polymer, copolymer or oligomer containing rubbery or elastomeric units such as siloxane or polybutadiene. Blended thermoplastics also fall into the applicable materials, such as the polyphenylene ether-polystyrene alloy and toughened PPO (NORYL® products available from SABIC-IP), silicon modified polyetherimide (SILTEM® products available from SABIC-IP), and toughened polyimide (EXTEM® products available from SABIC-IP). Accordingly, in certain embodiments the engineered particles of the invention can include the thermoplastic polymer chains as a single component. In other embodiments, the engineered particles can be present as a blend of thermoplastic polymers. In still other embodiments, the particles described herein can be formed from a hybrid structure wherein two or more thermoplastic polymers are used. The thermoplastic content of the engineered particles according to the invention can range from 1% to 99% by weight of the total particle.

In addition to the chemical structure of the polymer backbone, the polymer molecular weight is another way to control the overall cross-link density of the particles. In the case where the crosslinking occurs through the polymer chain ends, shorter molecules will be able to achieve a higher maximum cross-link density. Additionally, the thermoplastic may be a polymer or a pre-polymer.

A polymer comprises a molecule containing a sufficiently high number of chemically linked monomeric units to exhibit chain-entanglement whereas the equivalent prepolymer comprises the same chemically linked monomeric units but not of a sufficiently high number to exhibit chain-entanglement. In some embodiments, the molecular weight of the thermoplastic is about 3,000-100,000 g/mol, such as a molecular weight of 3,000 to 40,000 g/mol; more typically 3,000 to 20,000 g/mol.

The percentage of reactive pendant and chain ends and their type/reactivity is another parameter that controls the particles' final properties such as cross-linking density. In some embodiments, the reactive group can be an amine or phenolic group or derivative thereof as they show good reactivity toward some cross-linking agents. The term "derivative" as used herein may have its ordinary meaning as known to those skilled in the art and may include a chemical substance derived from another substance either directly or by modification or partial substitution. Thus, a compound that can be envisioned to arise from a parent compound by replacement of one atom with another atom or group of atoms can be considered a derivative of the parent compound, and can have the same or similar function as the parent compound. Hydroxyl, epoxy, carboxyl, methylol, glycidyl, anhydride, chloride, vinyl, vinyl ester, isocyanate, nadimide, acetylene, maleimide, phenolic, benzoxazine, cyanate ester, diene groups, and derivatives thereof are also reactive and offer a wide range of reactivity levels with different cross-linking agents. Accordingly, the nature of reactive groups may be one or more of the following: amine; hydroxyl; anhydride; glycidyl; carboxylic acid; maleimide; isocyanate; phenolic; nadimide; cyanate ester; acetylene; vinyl; vinyl ester; diene; or derivatives thereof. In some cases, unsaturations on the polymer chain might serve as cross-linking points (for acrylic and methacrylic family as well some unsaturated rubbers, vinyl esters or unsaturated polyesters).

In some embodiments, the number of reactive groups may be a minimum of 1 reactive group per chain and, in some embodiments, is considered as the lowest fraction necessary to create a connected polymer backbone; a number around or greater than 1.5 is preferred to produce a tightly cross-linked polymer or inter-penetrating network. Polymers with functionalities greater than 2 will easily produce highly reacted gels.

The term "engineered cross-linked thermoplastic particle" as used herein may have its ordinary meaning as known to those skilled in the art and may include a plurality of polymeric chains containing a thermoplastic polymer backbone including one or more thermoplastic polymers and having one or more reactive groups, and a cross-linking agent that is chemically reactive with the reactive groups such that the cross-linking agent directly cross-links the polymer chains together via the reactive groups. The engineered cross-linked thermoplastic particle may alternatively include a plurality of polymeric chains containing a thermoplastic polymer backbone having one or more thermoplastic polymers, and a cross-linking network composed of one or more chemicals that includes one or more reactive group and a cross-linking agent that is chemically reactive with the reactive groups and capable of polymerizing the chemical via the reactive groups, thereby forming an IPN. In certain embodiments, the cross-linking network is present in an amount ranging from 1% to 99% by weight of the total particle. In other embodiments, the range can be from 1% to 50% by weight of the total.

In some embodiments, the engineered cross-linked thermoplastic particles are thermodynamically compatible with a thermosetting resin. In further embodiments, the engineered cross-linked thermoplastic particles are substantially insoluble in the thermosetting resin. However, the engineered cross-linked thermoplastic particles are capable of swelling in uncured thermosetting resin precursors. Upon reaching and exceeding a specific onset temperature, which is specific to the properties of the particles, the particles present in the thermosetting resin will begin to swell due to the absorption of the resin's monomeric and oligomeric species. If the particles swell excessively at a low temperature, such as the temperature at which the particles and the resin are blended, the viscosity may increase such that fibers (such as carbon fibers) are difficult to impregnate with the resin/particle combination. In some embodiments, the resin/particle combination is heated to a temperature greater than the blending temperature for the diffusion of the resin into the particle to take place. The absorbed monomers subsequently react within the particles during the regular cure of the resin. Thus, the terms "not capable of substantially dissolving" or "substantially insoluble" do not exclude the ability of the particle to swell when present in the resin. "Substantially dissolving" or "substantially soluble" include forming a substantially homogeneous combination.

In some embodiments, the cross-linked particles for interlaminar toughening have good compatibility with thermosetting resins such as epoxies and insolubility in such monomers due to chemical cross-linking. In one embodiment, particles comprising a copolymer based on PES (polyether sulfone) and PEES (polyether ether sulfone) repeat units shows excellent compatibility with epoxy systems, and especially those that are cured with aromatic amines such as 4,4' diaminodiphenylsulfone (DDS).

The extent of cross linking in a particle may be measured using tests such as sol/gel fraction and the extent of swell in a monomeric epoxy resin, as discussed in detail in the Examples below.

In some embodiment, the thermoplastic particles do not comprise an elastomer or rubber. In other embodiments, the engineered cross-linked thermoplastic particles form a gradient interface upon formulation with thermosetting resins such as an epoxy resin.

The engineered cross-linked thermoplastic particles may have an average particle size of about 1 to 100 μm before curing of the composite; typically about 40 μm. They may be substantially spherical. The particle size will increase in the final and cured product due to the swell of the particles. In certain embodiments the average particle size in the final and cured particle can be from about 5 μm to about 40 μm.

The term "cross-linking agent" as used herein may have its ordinary meaning as known to those skilled in the art and may include any agent that is reactive with the functional/reactive groups and facilitates cross-linking. In some embodiments, the cross-linking agent has a reactivity of greater than two. In other embodiments, the cross-linking agent is miscible with the thermoplastic polymer backbone. In other embodiments, the cross-linking agent is not miscible with the thermoplastic polymer, for example, if the reaction is conducted in solution using a common solvent to the thermoplastic polymer and crosslinking agent. Examples of suitable thermoplastic polymers that are susceptible to be crosslinked for this application include, but are not limited to: polyethersulfones (PES) with hydroxyl ends, polyetherimides (PEI) whether hydroxyl ended, amine ended or anhydride ended, polyphenyleneoxides (PPO or polyphenylene ether PPE) with hydroxyl ends, polyaryletherketones (including PAEK, PEEK, PEKK) with fluoro or hydroxyl ends or any engineering polymers with reactive end group or main chain functionalities. Depending on the chemical nature of the polymer end groups/functionalities, an appropriate polyfunctional crosslinking agent can be selected. Examples of such crosslinking agents are: alkylated melamine derivatives (e.g. CYMEL® 303), acid chlorides (e.g. 1,3,5 benzenetricarbonyl trichloride), multi-functional epoxies (e.g. ARALDITE® MY0501 (triglycidyl p-aminophenol), MY721 (tetraglycidyl diaminodiphenylmethane)), carboxylic acids (1,2,4,5-benzenetetracarboxylic acid). Polyunsaturated thermoplastic polymers can also be easily crosslinked using radical addition using heat, UV or other radiation curing technique.

Examples of cross-linking agents include melamine derivatives widely used in the coatings industry, such as CYMEL 350 manufactured by Cytec Industries, which has an average of about 4.4 multiple reactive sites; a highly methylated melamine resin such as CYMEL 303 manufactured by Cytec Industries, which has an average of about 4.9 multiple reactive sites and has the following structure:

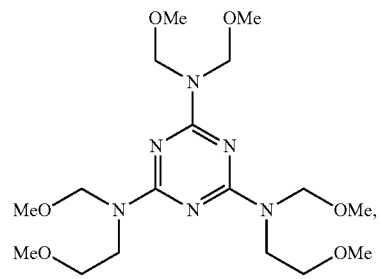 [SMILES: COCCN(COC)c1nc(N(CCOC)COC)nc(N(COC)COC)n1]

a highly alkylated glycoluril resin such as CYMEL 1170 manufactured by Cytec Industries, which has an average of about 2.9 multiple reactive sites and has the following structure:

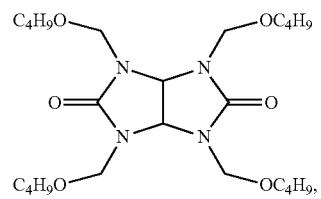

A resin that contains a tetrakis(methoxymethyl) glycoluril such as POWDERLINK® 1174 resin, which has an average of about 3.25 multiple reactive sites having the chemical name imidazo[4,5-d]imidazole-2,5(1H,3H)-dione tetrahydro-1,3,4,6-tetrakis(methoxymethyl) and has the following structure:

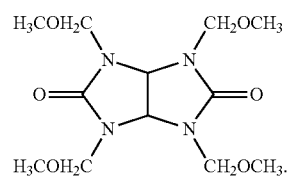

Other cross-linking agents suitable for use with this invention include, but are not limited to, epoxy-curative and vinyl terminated styrene-butadiene rubber ("SBR"). Commercially available cross-linking agents particularly suitable for use with the particles of the invention include, but are not limited to, those sold under the trademarks ARALDITE® (available from Hunstman Co.), HYPRO® and EPALLOY® (available from Emerald), ANCAMINE® (available from Air Products and Chemicals), CYMEL® (available from Cytec Engineered Materials), EPON® and HELOXY® (available from Hexion), D.E.R.® and D.E.N.® (available from Dow), and combinations thereof.

In certain embodiments, the proportion of the cross-linking agent to the thermoplastic backbone may be about 2 to about 15%, such as from about 4 to about 13%, by weight of the formulation. Typical amounts of cross-linking agent are about 6-8% of the combined weight of the formulation. The proportion of crosslinking agent to the thermoplastic backbone may be different for other types of crosslinking agents, and can be determined by those of skill in the art using methods requiring no more than routine experimentation.

The engineered cross-linked thermoplastic particle may be manufactured using a catalyst for the cross-linking reaction. The term "catalyst" as used herein may have its ordinary meaning as known to those skilled in the art and may include acid catalysts such as p-toluene sulfonic acid, or a strong sulfonic acid catalyst such as CYCAT® 500 manufactured by Cytec Industries. In another embodiment, the catalyst can include triphenyl phosphine.

In another aspect, the invention provides methods of making the engineered cross-linked thermoplastic particles as described in detail herein. In certain embodiments, the method comprises drying an emulsion of a thermoplastic polymer, a cross-linking agent or the components for a cross-linking network, and a catalyst, and curing the dried powder. The method may also comprise dissolving the thermoplastic polymer, the cross-linking agent or components for forming a cross-linking network, and the catalyst in a solvent, which may be immiscible with a second solvent (such as water) in the presence of a stabilizer, which may then be made into an emulsion. Accordingly, in certain embodiments the solvent can include, but is not limited to, dichloromethane, chloroform, methanol, toluene, and combinations thereof. In some embodiments, the method further includes stripping the solvent from the emulsion. The stripping can be performed by any method generally known to those skilled in the art including, for example, by gas, distillation, vacuum, or combinations thereof. In certain embodiments, the stabilizer can include, but is not limited to, ionic surfactants, non-ionic surfactants, polymer colloids, polymers, and combinations thereof. In certain embodiments, the stabilizer is a polyvinyl alcohol. In other embodiments, the stabilizer is a hydroxycellulose (such as, for example, hydroxymethylcellulose or hydroxyethylcellulose). The reacting conditions and the type and level of cross-linking agent will determine the final properties of the particles. Reacting conditions such as temperature result in greater cross-linking Cross-linking agents with greater functionality will affect the extent of the cross-linking of the thermoplastic particles. Other cross-linking agents with relatively lower functionality will cross-link to a lesser extent. The cross-linking agent concentration will also be directly proportional to the extent of cross-linking.

The methods of manufacturing the particles described herein can further include, in any order, washing, drying, milling, and/or sieving the particles. Those of skill in the art will appreciate that these steps can be achieved by any of numerous methods known in the art and/or performed using only routine experimentation.

The terms "matrix," "resin," and "matrix resin" as used herein have their ordinary meaning as known to those skilled in the art and may include one or more compounds comprising thermoset materials. Engineered cross-linked thermoplastic particles may be combined with thermosetting resins such as epoxy resins, which are useful in making composite materials. In certain embodiments, the particles can be present in an amount from 1% to 50% by weight of the total resin system. In other embodiments, the particles can be present at from 5% to 15% by weight. The term "thermosetting resin" as used herein may have its ordinary meaning as known to those skilled in the art and may include epoxies, imides (e.g., polyimides, bismaleimide (BMI)), cyanate esters, benzoxazines, phenol-formaldehyde resins, epoxy-acrylate and epoxy-methacrylate resins, polyester resins, vinylester resins, combinations thereof, and precursors thereof. In some embodiments, the thermosetting resin comprises monomers and/or low molecular weight liquids, which, when heated and its viscosity is low, the resin is absorbed by the engineered cross-linked thermoplastic particles that swell. In some embodiments, the resin cures in the particle. In some embodiments, the resin is capable of causing the engineered cross-linked thermoplastic particle to swell.

The terms "cure" and "curing" as used herein have their ordinary meaning as known to those skilled in the art and may include polymerizing and/or cross-linking processes. Curing may be performed by processes that include, but are not limited to, heating, exposure to ultraviolet light, electron beam, and exposure to radiation. Prior to curing, the matrix may further comprise one or more compounds that are, at about room temperature, liquid, semi-solid, crystalline solids, and combinations thereof. In further embodiments, the matrix within the prepreg may be partially cured in order to exhibit a selected stickiness or tack and/or flow properties. The curing process for making the particles described herein can be performed at a temperature between 20° C. to 300° C. for a period of between 1 to 48 hours.

Compositions of engineered cross-linked thermoplastic particles and resins described herein are useful in making prepregs. In addition, the engineered cross-linked thermoplastic particles of the present invention may be used in liquid molding processes, such as injection molding. The term "prepreg" as used herein has its ordinary meaning as known to those skilled in the art and thus includes sheets or lamina of fibers that have been impregnated with a matrix material within at least a portion of their volume. The matrix may be present in a partially cured state.

The term "fiber" as used herein has its ordinary meaning as known to those skilled in the art and may include one or more fibrous materials adapted for the reinforcement of composites. Fibers may take the form of any of particles, flakes, whiskers, short fibers, continuous fibers, sheets, plies, and combinations thereof. Continuous fibers may further adopt any of unidirectional, multi-dimensional (e.g. two- or three-dimensional), non-woven, woven, knitted, stitched, wound, and braided configurations, as well as swirl mat, felt mat, and chopped mat structures. Woven fiber structures may comprise a plurality of woven tows having less than about 1000 filaments, less than about 3000 filaments, less than about 6000 filaments, less than about 12000 filaments, less than about 24000 filaments, less than about 48000 filaments, less than about 56000 filaments, less than about 125000 filaments, and greater than about 125000 filaments. In further embodiments, the tows may be held in position by cross-tow stitches, weft-insertion knitting stitches, or a small amount of resin, such as a sizing.

The composition of the fibers may be varied, as necessary. Embodiments of the fiber composition may include, but are not limited to, glass, carbon, aramid, quartz, basalt, polyethylene, polyester, poly-p-phenylene-benzobisoxazole (PBO), boron, silicon carbide, polyamide, and graphite, and combinations thereof. In one embodiment, the fiber is carbon, fiberglass, aramid or other thermoplastic materials. The reinforcing fibers may be organic or inorganic. Further, the fibers may include textile architectures including those that are either continuous or non-continuous in form.

The term "layup" as used herein has its ordinary meaning as known to those skilled in the art and may include one or more prepregs that are placed adjacent one another. In certain embodiments, the prepregs within the layup may be positioned in a selected orientation with respect to one another. In a further embodiment, the prepregs may optionally be stitched together with a threading material in order to inhibit their relative motion from a selected orientation. In additional embodiments, "layups" may comprise any combination of fully impregnated prepregs, partially impregnated prepregs, and perforated prepregs as discussed herein. Layups may be manufactured by techniques that may include, but are not limited to, hand layup, automated tape layup (ATL), advanced fiber placement (AFP), and filament winding. The layups can then be cured, such as by autoclave, to form a composite article, wherein the particles of the invention are localized in the interleaf and provide increased toughness and damage tolerance of the composite article due to the particles remaining discrete particles even after the curing process.

In some liquid molding embodiments, the particles may be pre-dispersed in a preform containing fibers without resin. The term "preform" or "fiber preform" as used herein has its ordinary meaning as known to those skilled in the art and may include an assembly of fibers, such as unidirectional fibers and woven fabrics that are ready for receiving resin.

Selecting the appropriate thermoplastic polymer ensures the chemical compatibility (that is, thermodynamic compatibility) with the surrounding thermosetting matrix without the risk of particles dissolving into the resin. The chemical compatibility of the thermoplastic particles with the matrix promotes the diffusion of controlled amounts of the liquid resin into the particles increasing significantly the bonding of the particles with the resin. The benefit of the chemical compatibility does not come at the expense of the dissolution or leaching of thermoplastic into the resin due to the cross-linked nature of the particles, as discussed below in more detail. In some embodiments, the resin can diffuse into the particles and not the contrary, such that the particles will retain their mechanical integrity during the blending and curing process of the resin. Retaining some of their initial strength throughout the whole mixing, handling and curing of the prepregs enables the creation of a resin-rich area between plies, which is known to confer improved delamination resistance to the cured composite. Without the chemical compatibility, which confers a strong interface between the inclusion (particle) and the matrix, debonding and particle delamination are frequently observed. The lack of compatibility often leads to premature micro-cracking initiated at the interface between the particles and matrix.

Compatibility may be determined by measuring or calculating the Hansen or Hildebrand solubility parameters of the polymer and the resin but these calculations or measurements are cumbersome. Therefore, hot stage microscopy may be used. In this method, particles are mixed with different types of resins and then heated under a microscope to determine whether the particles interact with the resin or swell. In this process, the resin is commonly heated to about 120° C. in order to be at around the point of minimum viscosity. In addition, diffusion speed is increased by temperature on an Arhenius basis. This is implemented to reduce the testing time, but also to simulate better the real conditions during a curing process.

Another benefit of embodiments of the invention is the ability to achieve locally high concentration of thermoplastic in the interlaminar region without facing the risk of obtaining a phase inverted system. The thermoplastic content in the interlaminar region is known to increase the toughness of the material. However, when large quantities of linear compatible thermoplastic are blended with or dissolved into a thermosetting resin, the thermoplastic is known to phase separate in an inverted manner during the cure of the resin, also known as reaction induced phase separation, leading to a thermoplastic continuous phase with inclusions of thermosetting polymer. This phase inversion, in turn, is severely detrimental to the properties of the composite, primarily for temperature resistance and solvent resistance. Embodiments of the engineered cross-linked thermoplastic particles do not cause phase inversion. High thermoplastic content may be achieved, therefore, without compromising the temperature or solvent resistance of the material.

In composites, the engineered cross-linked thermoplastic particles are capable of achieving a much higher local concentration without inversion than un-cross-linked thermodynamically compatible counterparts. For example, a local concentration of engineered cross-linked thermoplastic particles may be approximately 10-50 weight percent of the resin composition in the interlaminar region. "Local concentration" is a qualitative term and refers to the weight or volume fraction of each component in the interlaminar region. The interlaminar region is the portion of a composite material that comprises the resin-rich region of a composite between layers of fibers such as carbon fiber. The local concentration is achieved without phase inversion, or without forming a thermoplastic with thermoset inclusions. In some embodiments, the composite structure is a thermoset with thermoplastic inclusions.

In some embodiments, the temperature resistance of the composite material is about 80-350° C. Conventionally, temperature resistance is measured by the process of measuring the modulus reduction with increased temperature (using for instance Dynamic Mechanical Thermal Analysis or DMTA) or measuring the glass transition temperature of the material by Differential Scanning calorimetry. In other embodiments, the solvent resistance of the composite material is about 0-15%. Conventionally, solvent resistance is measured by the process of measuring the solvent weight uptake versus time.

Figure 1B:
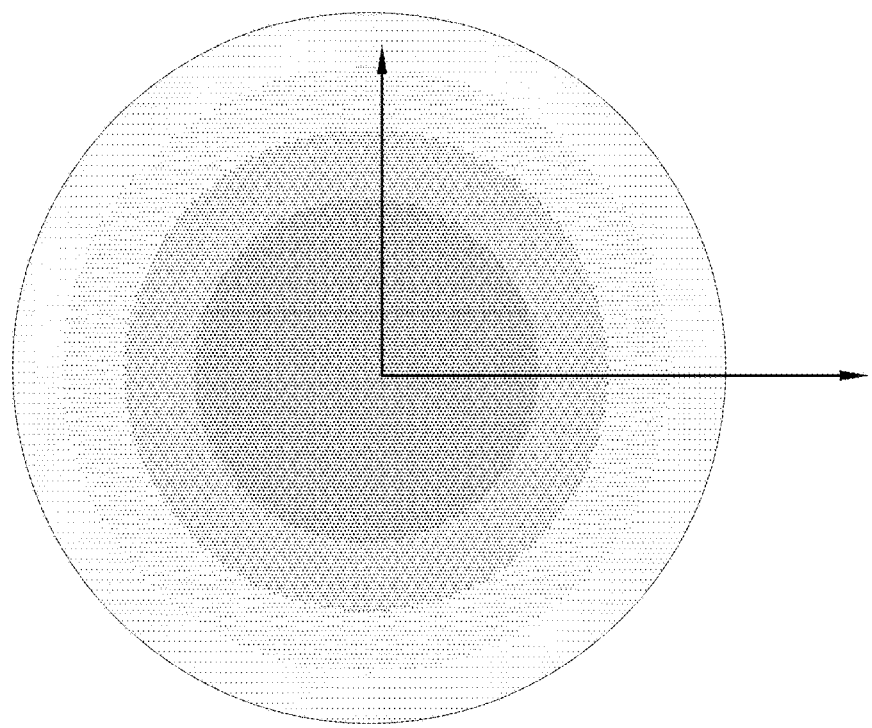

Some embodiments of the present invention are based on the design of a gradual and strong interface between the particles and the surrounding matrix by using a thermodynamically compatible thermoplastic that is cross-linked to prevent its dissolution yet allowing its swelling in the resin. The term "gradient interface" as used herein has its ordinary meaning as known to those skilled in the art and relates to the gradual and strong interface between each of the particles and the surrounding resin matrix. A gradient interface is achieved by using engineered cross-linked thermoplastic particles that are thermodynamically compatible with the resin. As shown in FIGS. 1A and 1B, the concentration of thermoplastic in the core of a thermoplastic particle containing a resin is greatest at the center and gradually decreases towards the outer surface of the particle as the matrix enters the particle from the outer surface and moves towards the core. This gradual decrease in the thermoplastic concentration from the core to the outer surface of the thermoplastic particle forms the gradient interface between each of the thermoplastic particles and the surrounding resin. Thus, there is no sharp delineation or transition between the thermosetting resin and the thermoplastic particle. If a sharp delineation or transition was present, the interface between the thermoplastic and the thermosetting resin would be much weaker in a composite material in comparison to a composite material containing a gradient interface.

In certain embodiments, the particles become completely swollen and therefore the gradient of properties within/throughout the particles become close to zero. The particles may no longer be thermoplastic or thermosets. Such a result may happen with particles that are loosely crosslinked, or in a resin that has a low viscosity and that is thermodynamically close to the polymer. During the cure of the thermosetting resin, due to rapid diffusion of the low molecular weight resin, the particles will have time to become fully swollen.

In other embodiments, particles include "layered particles" such as, but not limited to, core-shell structures where the swell ability of each layer is independently controlled through the manufacturing of the particles. In some embodiments, each layer may swell to a different extent in comparison to a neighboring layer.

"Thermodynamic compatibility" may be achieved by using thermoplastic that is cross-linked to prevent its dissolution into the matrix but allows it to swell in the resin. A thermoplastic is soluble in a resin if it becomes fully homogenized during the preparation of a composite material. Thus, in some embodiments, thermoplastic particles are not fully homogenized during the preparation of a composite material. Although one may be able to predict in some circumstances whether or not thermoplastic particles are compatible with the resin, one way to test whether thermoplastic particles are thermodynamically compatible with resin is to combine particles with a resin to determine whether the resin swells the particles without dissolving them and to prepare a cured material to determine whether the particles maintain themselves as discrete particles after curing. Examples of thermoplastic particles that are thermodynamically compatible with epoxy resin but do not dissolve after they have been cross-linked include, but are not limited to, polyetherimide, polysulfone, and polyethersulfone.

The term "discrete particle" as used herein has its ordinary meaning as known to those skilled in the art and includes particles which are discernible in the interlaminar region, and which may be detected by using Scanning Electron Microscopy (SEM), Optical Microscopy, Differential Interference Contrast microscopy (DIC).

Another advantage of this enhanced gradient interface is the ability of the stress to be efficiently transferred between the particles and the surrounding matrix. The stress transfer ability relates to the fullest toughening properties of the particles. Many complex mechanisms have been identified in the past, many of them based on the assumption that the stress introduced in the material is transferred into the particles so that plastic deformations and other energy consuming mechanisms can happen effectively. Furthermore, an inefficient stress transfer would also result in reduced stiffness and strength of the matrix, which would translate into a reduced elastic modulus of the matrix.

Composite materials including the engineered cross-linked thermoplastic particles have the ability to transfer stress efficiently between the particles and the surrounding resin matrix. The stress transfer ability may be measured by photoelasticity.

A further benefit of engineered cross-linked thermoplastic particles is improved lifecycle performance of the composite material in comparison to the same composite material with different particles or without the engineered cross-linked thermoplastic particles. Whereas conventional resins blended with a high concentration of phase separated non-cross-linked thermoplastic would suffer from crazing or micro-cracking after repeated thermal or mechanical cycles, resins modified with cross-linked particles advantageously sustain cyclic testing more robustly, due to the particles' cross-linked nature and the presence of thermoset resin within the particles.

Composite materials incorporating the engineered cross-linked thermoplastic particles have improved mechanical properties such as compression after impact (CAI) or (CSAI) fracture toughness or delamination resistance in mode I and II ($G_{IC}$ and $G_{IIC}$ respectively) OHC (Open Hole Compression). CAI (or CSAI) measures the ability of a laminate/composite material to tolerate damage. According, to this method, the laminate to be tested is subject to an impact of a given energy prior to be loaded in compression. The laminate is constrained during the test to ensure that no elastic instability is taking place. The strength of the laminate is recorded. The benefit of interlaminar toughening particles is primarily noticed in the properties of the material that involve fracture, such as CAI, $G_{IC}$ and $G_{IIC}$, $K_{IC}$ and $K_{IIC}$ as exemplified in Examples 22-23 below. The properties of $K_c$ and $G_c$ represent the fracture toughness, which is a property that describes the ability of a material containing a crack to resist fracture. K is a representation of the stress intensity factor whilst G is the fracture energy. $K_{IC}$ can be measured following the ISO standard "Plastics—Determination of fracture toughness ($G_{IC}$ and $K_{IC}$)—Linear elastic fracture mechanics (LEFM) approach (ISO 13586:2000)" or by following the procedure recommended by the ESIS committee, "Fracture Mechanics Testing Methods for Polymers Adhesives and Composites," D. R. Moore, A. Pavan, J. G. Williams, ESIS publication 28, 2001, pp 11-26.

In some embodiments, high Tg composite materials (e.g., Tg of at least 180° C.) are fabricated so that the neat resin materials in the interlaminar region may have a $K_{IC}$ of at least about 0.8 to about 3 MPa·m$^{0.5}$ (typically between 0.9 and 1.1), and a $G_{IC}$ of at least about 200 to about 500 J/m$^2$ (typically about 250 J/m$^2$).

In addition, the concept of preformed particle toughening can be exploited in other areas where toughening is required, this includes but is not limited to adhesive formulations, primary and secondary structure thermosetting formulation.

$K_{IC}$ and $G_{IC}$ of the cured resin can be measured by Linear Elastic Fracture Mechanics (LEFM) as described in more detail in Example 22.

In one aspect, resin modified with engineered cross-linked thermoplastic particles sustains cyclic testing. Such testing involves subjecting composite material comprising the modified resin to repeated thermal or mechanical cycles and then measuring the presence of crazing or micro cracking. The presence and extent of micro cracking is usually carried out by SEM analysis, reporting the number of observable micro-cracks per unit length.

Another advantage of using cross-linked particles includes the ability to tailor their properties by controlling their cross-link density, such as by changing the cross-linker concentration and hence the cross-linking degree in the particles, which also makes it possible to tailor the swell factor of the particles. This tailoring ability is significant when considering the numerous variants of resins consisting of blends of monomers that may interact differently with thermoplastic particles. Having the ability to easily tailor the properties of the particles provides a powerful tool to the resin formulator and also ensures that toughening particles are exploited fully. For instance, as the swelling of the particles increases, the thermoplastic properties that are conferred to the composite material decrease.

Thus, methods of tailoring the properties of the particles to achieve properties and specific epoxy resin formulations are also contemplated. A method for tailoring the properties of the particles may include the steps of measuring the speed and extent of diffusion of a specific resin formulation and assessing consequently the appropriate particle cross-link density to specifically suit the formulation.

The terms "approximately," "about," and "substantially" as used herein represent an amount close to the stated amount that still performs the desired function or achieves the desired result. For example, the terms "approximately," "about," and "substantially" may refer to an amount that is within less than 10% of, within less than 5% of, within less than 1% of, within less than 0.1% of, and within less than 0.01% of the stated amount. The term "at least a portion of" as used herein represents an amount of a whole that comprises an amount of the whole that may include the whole. For example, the term "a portion of" may refer to an amount that is greater than 0.01% of, greater than 0.1% of, greater than 1% of, greater than 10% of, greater than 20% of, greater than 30% of, greater than 40% of, greater than 50% of, greater than 60%, greater than 70% of, greater than 80% of, greater than 90% of, greater than 95% of, greater than 99% of, and 100% of the whole.

Other Embodiments

1. An engineered particle comprising:
a) a plurality of polymeric chains comprising a thermoplastic polymer backbone comprised of one or more thermoplastic polymers, and one or more reactive group; and
b) a cross-linking agent chemically reactive with the one or more reactive group,
wherein said cross-linking agent directly cross-links the polymer chains to each other via the reactive groups.

2. An engineered particle comprising:
a) a plurality of polymeric chains comprising a thermoplastic polymer backbone comprised of one or more thermoplastic polymers; and
b) a cross-linking network comprising one or more chemical having one or more reactive group, and a cross-linking agent capable of polymerizing said chemical via the reactive group,
wherein (a) and (b) together form an inter-penetrating polymer network.

3. An engineered particle according to embodiment 2, wherein each of said polymer chain has one or more reactive group.

4. An engineered particle according to any one of embodiments 1-3, wherein said one or more reactive group is terminally located.

5. An engineered particle according to any one of embodiments 1-4, wherein the thermoplastic polymer chains are chosen from: polycarbonate; polyetherimide; polyamide; polyimide; polysulfone; polyethersulfone; polyphenylene oxide; polyether ketones; styrene-butadiene; polyacrylates; polyacetol; polybutyleneterephthalate; polyamide-imide; polyhydroxyethers; polyphenyl sulfides; polysiloxanes; copolymers thereof; and combinations thereof.

6. An engineered particle according to any one of embodiments 1-5, wherein the thermoplastic polymer chains are chosen from: polyphenylene ether-polystyrene alloy and toughened polyphenylene oxide; silicon modified polyetherimide; toughened polyimide and combinations thereof.

7. An engineered particle according to embodiment 6, wherein the plurality of chains of one or more thermoplastic polymer is chosen from polymers sold under the trademarks: ULTEM®; NORYL®; SILTEM®; and EXTEM®.

8. An engineered particle according to any one of embodiments 1-7, wherein the thermoplastic content ranges from 1 to 99% by weight of the total particle.

9. An engineered particle according to any one of embodiments 1-8, wherein the reactive groups are chosen from one or more of: vinyl; amine; epoxy; hydroxyl; carboxylic acid; anhydride; chloride; isocyanate; nadic; acetylene; maleimide; vinyl ester; benzoxazine; cyanate ester; phenolic; and derivates thereof.

10. An engineered particle according to any one of embodiments 2-9, wherein the cross-linking agent is vinyl terminated styrene-butadiene-rubber.

11. An engineered particle according to any one of embodiments 2-10, wherein the cross-linking network is present in an amount ranging from 1 to 99% by weight of the total particle.

12. An engineered particle according to embodiment 11, wherein the range is from 1-50% by weight of the total particle.

13. An engineered particle according to any one of embodiments 2-12, wherein the inter-penetrating network is a semi-inter-penetrating network.

14. An engineered particle according to any one of embodiments 1-13, wherein the average particle size is between 1 to 100 microns, preferably 1 to 40, more preferably 5 to 40.

15. A resin system comprising:
a) a thermosetting resin; and
b) a plurality of engineered cross-linked particles according to any one of embodiments 1-14,
wherein the particles are partially or totally insoluble in said resin upon curing.

16. A resin system according to embodiment 15, wherein the resin is chosen from one or more thermosetting system chosen from: epoxy; bis-maleic anhydride; polyimide; cyanate ester; phenolic; vinyl ester; and benzoxazine.

17. A resin system according to any one of embodiments 15-16, wherein the particles are present in an amount from 1% to 50% by weight of the total resin system.

18. A resin system according to embodiment 17, wherein the amount of particles is from 5% to 15% by weight.

19. A prepreg comprising the engineered particle according to any one of embodiments 1-14, or the resin system according to any one of embodiments 15-18.

20. A composite article comprising the engineered particle according to any one of embodiments 1-14, or the resin system according to any one of embodiments 15-18, wherein said particles remain discrete particles following a curing process, and wherein said particles are localized in the interleaf and provide increased toughness or damage tolerance of said composite article.

21. A composite article according to embodiment 20 further characterized by one or more of the following:
  i) reduced solvent sensitivity;
  ii) improved hot/wet performances/properties;
  iii) improved processing properties; and
  iv) micro-cracking resistance.

22. A method of manufacturing an engineered particle according to any one of embodiments 1-14, the method comprising:
  a) dissolving said thermoplastic polymer chains and said cross-linking agent or, if present, the components of said cross-linking network in a solvent;
  b) forming an emulsion by mixing the solution of step (a) with a second solution in the presence of one or more stabilizers, said second solution being immiscible to that formed in step (a);
  c) stripping said solvent out of the emulsion of step (b), thereby forming a plurality of solid particles; and
  d) curing the solid particles, thereby cross-linking said particles directly or forming an inter-penetrating polymer network.

23. A method according to embodiment 22 further comprising one or more of:
  i) washing said particles;
  ii) drying said particles;
  iii) milling said particles; and
  iv) sieving said particles.

24. A method according to any one of embodiments 22-23, wherein the emulsion is either oil-in-water or water-in-oil.

25. A method according to any one of embodiments 22-24, wherein the curing step is performed by a process chosen from: heat; radiation; electron beam; and UV light.

26. A method according to any one of embodiments 22-25, wherein said solvent is chosen from one or more of: dichloromethane, chloroform, methanol, toluene, and combinations thereof, and wherein said second solution is water.

27. A method according to any one of embodiments 22-26, wherein said stabilizer is chosen from: ionic surfactants; non-ionic surfactants; polymer colloids, polymers; and combinations thereof.

28. A method according to any of embodiments 22-27, wherein the stabilizer is chosen from polyvinyl alcohol, hydroxycellulose; hydroxymethylcellulose; and hydroxyethylcellulose.

29. A method according to any one of embodiments 22-28, wherein the solvent is stripped via gas, distillation, or vacuum.

30. A method according to any one of embodiments 22-29, wherein the curing step is performed at a temperature between 20° C. to 300° C. for a period of between 1 to 48 hours.

31. A method according to any one of embodiments 22-30, wherein step (a) further includes dissolving a catalyst.

32. A method of manufacturing a composite article having increased toughness and damage tolerance, the method comprising:
  a) adding the particles according to any one of embodiments 1-14 or manufactured according to any one of embodiments 22-31 to a thermosetting resin system;
  b) forming a multiple of prepregs with the resin system of step (a);
  c) laying up the prepregs to form a shaped article, wherein said engineered particles are localized in the interleaf; and
  d) curing said article,
thereby forming a composite article having increased toughness and damage tolerance.

EXAMPLES

The following examples are provided to assist one skilled in the art to further understand certain embodiments of the present invention. These examples are intended for illustration purposes only and are not to be construed as limiting the scope of the claims of the present invention.

Methods of making various embodiments of the engineered particles according to the invention are exemplified below. Generally, engineered crosslinked thermoplastic particles according to the invention can be produced in an emulsion process by dissolving the polymer, crosslinking agent or components of crosslinking network, and catalyst into a common solvent, which is immiscible with water. An emulsion is then created in water by using a non-ionic surfactant.

The emulsified particles are subsequently dried and cured so that the polymeric chains become chemically crosslinked or tied up via the formation of a separate and independent crosslinking network and consequently made insoluble thereby forming a chemical 3D network.

The reaction conditions and the type and level of crosslinking agent or crosslinking network will determine the final properties of the particles as described herein.

When blended in a thermoset resin, once the resin temperature gets over a specific onset temperature (which is specific to the properties of the particles), the particles start to swell due to the absorption of the monomeric species. The absorbed monomers subsequently react in the particles during the regular cure of the resin.

This process results in thermoplastic-rich particles that exhibit a gradient composition profile at the interface. This engineered interface exhibits improved interfacial bonding properties. FIGS. 1A and 1B illustrate the evolution of the particles properties after the matrix monomers have diffused into the particles. A highly crosslinked particle (FIG. 1A) and a more loosely crosslinked particle (FIG. 1B) are compared. The x axis represents the distance away from the core particle and the y axis represents the thermoplastic concentration. Thus, FIG. 1A, includes a higher thermoplastic concentration towards the core of a more highly crosslinked particle, while FIG. 1B illustrates the lower thermoplastic concentration in the core of a less highly crosslinked particle.

Various embodiments of the engineered particles according to the invention may be characterized by two major tests: the sol/gel fraction and the extent of swell in a monomeric epoxy resin.

The first test is a simple procedure that provides an estimation of the amount of chemically crosslinked polymer in the particles. A known amount of particles is mixed into a suitable solvent, i.e. dichloromethane in the case of PILT-100 particles, and filtered to determine the gel fraction of the particles. Typical values are found to be around 70%. Commonly, particles are found in the range of 50-99%.

Figure 2:
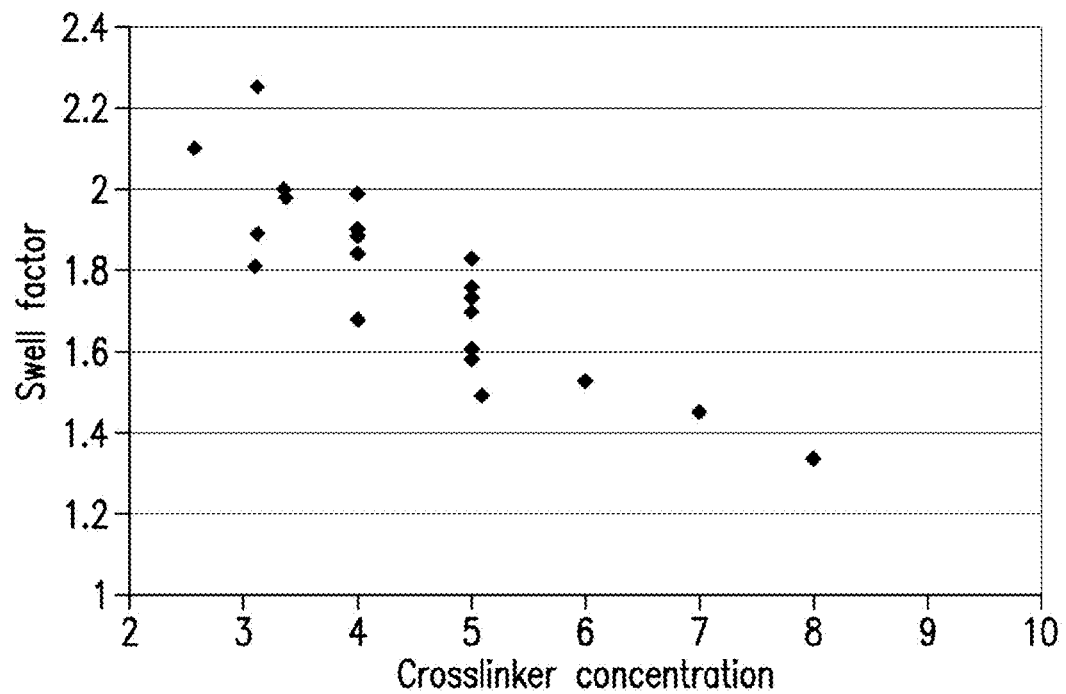
FIG. 2 illustrates the cross-linker concentration versus the swell factor of the particles.

The second test measures the ability of the particles to absorb monomeric resin such as epoxy monomers. A standard procedure consists of observing the swell behavior of a set of approximately 10 particles, blended in a low viscosity epoxy resin such as ARALDITE MY0510, whilst the resin is heated to high temperature. The diameter of the particles when fully swollen by the monomer is compared to the original particle diameter and the swell factor is calculated. For practical reasons, the "reciprocal swell," i.e. Di/Df, is often reported. By changing the crosslinker concentration and hence the crosslinking degree in the particles, it is possible to tailor the swell factor of the particles. This is illustrated in the graph of FIG. 2.

Comparative Example 1

Comparative Example 1 is the emulsified particle of pure ULTEM 1000 (polyetherimide available from SABIC-IP), which serves as the control and comparative material.

500 grams of ULTEM 1000 is dissolved in 1500 grams of dichloromethane. Under high shear, this solution is pumped into a vessel containing 5000 grams of water which has 225 grams of pre-dissolved polyvinyl alcohol (CELVOL 203 from Celanese). After an emulsion is formed, the solvent is removed by pumping nitrogen through the emulsion. When there is no condensation collected in the cold trap, the dispersion containing particles is diluted with water for several times, filter through 40 micron mesh. The particles are then dried at 80° C. under vacuum, lightly milled and sifted. The particle thus prepared is coded as PEI-P#1.

Example 1

Example 1 uses a long chain rigid (i.e., high $T_g$) polymer network to form the semi-IPN.

450 grams of ULTEM 1000 and 142.86 grams of KM180 (Cytec) is dissolved in 2428 grams of dichloromethane. To the solution is added 7.14 grams of ARALDITE MY0510 (from Huntsman Co.). After uniform solution is formed the solution is pumped into a vessel containing 6750 grams of water having 270 grams of CELVOL 203 pre-dissolved. The solution is pumped for duration of 30 minutes in presence of high shear. After the emulsion is formed, the solvent is removed by pumping nitrogen through the vessel. After no condensate is collected in the cold trap, the dispersion containing solid particles is diluted with water and filter through 40 micron mesh. Repeat the dilution 10 times and the particles are collected and dried at 50° C. under vacuum for 12 hours. The particle is cured for 3 hours at 220° C., lightly milled and sifted to yield the particles. The particle thus prepared is coded as PEI-P#3.

Example 2

Example 2 uses a long chain soft (i.e., low $T_g$) polymer network to form the semi-IPN.

Example 2 uses the same process as Example 1, with 450 grams of ULTEM 1000, 135 grams of HYPRO 1300 X16 ATBN (Amine Terminated Butadiene-Acrylonitrile) from Emerald Performance Materials Co., and 15 grams of ARALDITE MY0510. The cure condition is 170° C. for 1 hour.

The particle prepared in Example 2 is coded as PEI-P#4.

Example 3

Example 3 uses a short chain rigid polymer network to form the semi-IPN.

Example 3 uses the same process as Example 1, with 510 grams of Ultem 1000, 59 grams of ARALDITE MY0510, and 31 grams of ANCAMINE® 2167 (cycloaliphatic amine curing agent from Air Products). The cure condition is 200° C. for 1 hour.

The particle prepared in Example 3 is coded as PEI-P#5.

Example 4

Example 4 demonstrates the direct cross-linking of thermoplastic polymers to prepare the particle that has controlled swell or insoluble in the resin formulation used for composite manufacturing.

Example 4 uses the same process as Example 1, with 593.7 grams of an amine terminated polyetherimide and 6.3 grams of ARALDITE MY0510. The cure condition is 5 hours at 230° C.

The particle prepared in Example 4 is coded as PEI-P#13.

Example 5

Example 5 demonstrates the hybrid particle made with two thermoplastic polymers.

Example 5 uses the same process as Example 1, with 300 gram of NORYL 853 (a polyphenylene ether by Sabic-IP), 270.84 grams of KM180 (a polyethersulfone block copolymer), and 29.16 grams of CYMEL 350 (a methylated melamine derivative by Cytec). The cure condition is 3 hours at 180° C.

The particle prepared in Example 5 is coded as XKM-PPO#2.

Example 6

Example 6 demonstrates the direct cross-linking of thermoplastic polymers to prepare the particles that are denser and less prone to micro cracking.

Example 6 uses the same process as Example 1, with 533.4 grams of hydroxyl terminated polyphenylene ether, 66 grams of ARALDITE MY0510, and 0.6 grams of triphenyl phosphine (from Arkema). The cure condition is 2 hours at 180° C.

Example 7

The effectiveness of cross-linking is measured by the gel level of the particles, using a sol-gel method. This test is a simple procedure that provides an estimation of the amount of chemically cross-linked polymer in the particles. A known amount of particles is mixed into a suitable solvent, e.g. dichloromethane, and filtered to determine the gel fraction of the particles. Typical values are found to be around 70%. Commonly, particles are found in the range 50-99%.

In this method, a good solvent for the thermoplastics, such as dichloromethane or chloroform, is used to dissolve the particles. After 24 hour dissolution at room temperature, the mixture is filtered through a 0.5 micron filter. The solution portion which filtered through, and the gel portion which is retained by the filter, are thoroughly dried and weighed. If the solids in solution and the dry gel add up to 100%+/−5%, the measurement is deemed as valid, and the percentage gel is recorded.

The gel levels of some of the particles exemplified herein are listed in Table 1.

TABLE 1

| Particle | Gel Level (%) |
|---|---|
| PEI-P #1 | 0 |
| PEI-P #3 | 14 |
| PEI-P #4 | 41 |
| PEI-P #5 | 62 |
| PEI-P #13 | 30 |
| XKM-PPO #1 | 82 |

The results in Table 1 indicate that the gel level can be varied significantly depending on the technique and the cross-linking method utilized.

The effect of the gel level on how much the particles can retain their shape is demonstrated in FIGS. 4A-D.

Example 8

The ability of the particles to remain insoluble is important to the toughness they can bring to the composite. To test the toughness, the compressive strength after impact (CAI) is commonly used by the industry. Composite is made by depositing the particles on a blank prepreg containing no particles. Composite CAI is tested according to BSS7260-Type II Class I. The results are listed in Table 2.

From the CAI data in the table below, it is evident that using ULTEM_1000 as a soluble thermoplastic (TP) is much less effective than its particulate forms, and therefore validates this technical approach.

TABLE 2

| Particle | gel (%) | CAI (ksi) | dent (mil) | damage area (3 db, in$^2$) | Microcracking by microscopy |
|---|---|---|---|---|---|
| Blank | n/a | 30.3 | 20 | 2.155 | — |
| PEI-P #1 | 0 | 36.7 | 12 | 2.023 | None |
| PEI-P #3 | 14 | 45.0 | 12 | 1.055 | None |
| PEI-P #4 | 41 | 44.9 | 11 | 0.939 | None |
| PEI-P #5 | 62 | 44.4 | 9 | 1.464 | None |

The data in Table 2 indicate that maintaining the particle definition significantly improves the toughness of the composite. The data further indicate that the particles can perform to their toughening without causing microcracking problems.

Example 9

Another test to examine the composite fracture toughness is $G_{IIC}$. It is tested by placing a separation film between the center plies, 10 and 11. The testing is conducted according to test method BMS 8-276-Mode II. The results are listed in Table 3.

TABLE 3

| Particle | $G_{IIC}$ (in · lb/in$^2$, average of 3 cracks) |
|---|---|
| PEI-P #1 | 9.90 |
| PEI-P #3 | 9.93 |
| PEI-P #4 | 13.20 |
| PEI-P #5 | 7.13 |

From data in Table 3 it is seen that the engineered particles can significantly improve the fracture toughness.

Example 10

Microcracking in composite material is an indicator of poor material reliability because it can lead to part failure, due to multiple takeoffs and landings of aerospace vehicles. Microcracking can be observed under microscopy with the help of florescent dyes. In our experiments the microcracking is qualitatively measured using this microscopic method with the Zyglo fluorescent dye.

Polyphenylene ether, such as the NORYL series from SABIC-IP, is an effective toughening thermoplastics. However, this type of material is prone to microcracking, even without thermo cycling. By hybriding this material with other thermoplastics, it is possible to reduce or eliminate the microcracking. Preliminary results are shown in Table 4.

TABLE 4

| Particle | Gel (%) | CAI (ksi) | Microcracking at 0 thermal cycle | Note |
|---|---|---|---|---|
| NORYL PPO 853 | 0 | 46.3 | See FIG. 5A | Microcracking evident |
| xKM-PPO #2 | 21 | 45.5 | See FIG. 5B | No microcracking |

Example 11

This example shows the application of the invention concept and process to prepare interleaf toughening particles using a siloxane modified polyetherimide as the thermoplastics.

552.5 grams of SILTEM 1500 (SABIC-IP) is dissolved in 2210 grams of dichloromethane. To the solution is added 63.93 grams of ARALDITE MY0510 (Huntsman Co.), followed by 33.57 grams of ANCAMINE 2167 (Air Products). After a uniform solution is formed the mixture is pumped into a vessel containing 7020.0 grams of water having 292.5 grams of Celvol 203 pre-dissolved. The mixture is pumped for duration of 60 minutes under high shear. After the emulsion is formed, the solvent is removed by pumping nitrogen through the vessel. After no condensate is collected in the cold trap, the dispersion containing solid particles is diluted with water and filter through 40 micron mesh. Repeat the dilution 10 times and the particles are collected and dried at 60 C under vacuum for 12 hours. The particle is cured for 1 hours at 180° C., lightly milled and sifted to yield the particles. The particle thus prepared is coded as STM #1.

Examples 12 and 13

Example 12 and 13 use the same process as Example 11, and according to the formulation in the following table.

TABLE 5

| | Example 11 STM #1 | Example 12 STM #2 | Example 13 - comparative STM #3 |
|---|---|---|---|
| SILTEM 1500 | 552.5 | 510 | 600 |
| ARALDITE 0510 | 63.93 | 9.0 | 0 |
| ANCAMINE 2167 | 33.57 | 0 | 0 |
| HYPRO 1300X16 [1] | 0 | 81.0 | 0 |
| Gel % | 53 | | 0 |
| CAI, ksi | 41.3 | | 23.7 |
| $G_{iic}$, in · lb/in$^2$, avg. of 3 cracks | 9.7 | | 3.6 |

[1] HYPRO 1300X16 is an ATBN supplied by Emerald Performance Materials.

It is clearly shown that the SILTEM particles engineered according to the present invention significantly improve composite performance.

Examples 14 and 15

Example 14 and 15 demonstrate the application of the concept of the present invention and process to prepare interleaf toughening particles using modified polyimide as the thermoplastics.

These examples use the same process as Example 11, and according to the formulation in the following table.

TABLE 6

|  | Example 14 EXT #1 | Example 15 - Comparative EXT #2 |
|---|---|---|
| EXTEM XH1015 [1] | 510 | 600 |
| ARALDITE 0510 | 59.02 | 0 |
| ANCAMINE 2167 | 30.98 | 0 |
| Gel % | 70 | 0 |
| CAI, ksi | 38.4 | 37.6 |
| $G_{iic}$, in · lb/in$^2$, avg. of 3 cracks | 9.0 | 7.7 |

[1] EXTEM XH1015 is a polyimide supplied by SABIC-IP.

These examples show that the engineered particles give improved composite performance. Notably there is also some variation as between the thermoplastic selected.

Examples 16, 17 and 18 are particles using polyphenylene ether (PPO) as the thermoplastics. Because PPO is insoluble in the composite resin formulation, this type of particle demonstrates the application of the concept of the present invention to a material that by itself can be used as an interleaf particle toughener.

Example 16

Example 16 is a particle prepared using the emulsion process and does not contain other chemical modifiers. This particle is given for comparative reference.

600 grams of NORYL PPO 640 (SABIC-IP) is dissolved in 2929 grams of chloroform. The solution is pumped into a vessel containing 6480 grams of water having 270 grams of CELVOL 203 pre-dissolved. The mixture is pumped for duration of 60 minutes under high shear. After the emulsion is formed, the solvent is removed by applying vacuum. Vacuum is increased steadily along the process so that excess foam is prevented. After no condensate is collected in the cold trap, the dispersion containing solid particles is diluted with water and filter through 40 micron mesh. Repeat the dilution 10 times and the particles are collected and dried at 60° C. under vacuum for 12 hours. The material is lightly milled and ready for use. The particle thus prepared is coded as EPPO-640.

Examples 17 and 18

Examples 17 and 18 use the same process as Example 16. The polymer solution composition is listed in the table below.

TABLE 7

|  | Example 16- comparative EPPO 640 | Example 17 EPPO #7 | Example 18 EPPO #11 |
|---|---|---|---|
| NORYL PPO 640 | 600 | 540 | 552 |
| ARALDITE 0510 | 0 | 29.4 | 3.0 |
| ANCAMIDE ® 506 [1] | 0 | 30.6 | 0 |
| HYPRO 1300X31 [2] | 0 | 0 | 45.0 |
| Gel % | 0 | 51 | 51 |
| CAI, ksi | 46.6 | 51.5 | 50.6 |
| 0 cycle micro-cracking | Yes | No | No |

[1] ANCAMIDE ® 506 is an amido amine supplied by Air Products, Inc.
[2] HYPRO 1300X31 is a CTBN supplied by Emerald Performance Materials.

It is shown that engineering the in-soluble thermoplastics using the invention concept improves the composite CAI and microcracking performance.

Examples 19 and 20

Examples 19 and 20 demonstrate the preparation of interleaf particles by direct cross-linking of thermoplastic polymers using different functional groups to achieve the cross linking Example 19 and 20 use the same process as Example 1. The particle composition and results are summarized in Table 8. It is clearly indicated that the cross-linked particles give significantly higher toughness to the composite.

TABLE 8

Interleaf particle cross-linked by Cymel and Epoxy resin

|  | Example 19 | Example 20 | Comparative example |
|---|---|---|---|
| HC99 polymer | 570.70 | 571.2 | 600 |
| CYMEL 350 | 29.32 | 0 | 0 |
| p-toluene sulfonic acid | 1.05 | 0 | 0 |
| ARALDITE MY 0510 | 0 | 28.8 | 0 |
| Cure condition | 4 hours @225 C. | 2 hours @200 C. |  |
| Gel % | 80 | 80 | 0 |
| CAI (ksi) | 45.8 | 43.7 | 30.7 |

Example 21

Particles according to the invention can also be formed according to the methods above using the recipes given in Tables 8A-D below.

TABLE 9A

|  | Typical quantity (g) | Useful range (g) |
|---|---|---|
| HC99 polymer | 65 | 65 |
| CYMEL 350 | 5 | 3-10 |
| p-toluene sulfonic acid | 0.15 | 0.1-0.5 |

CYMEL 350, shown below, is a melamine derivative that reacts via a condensation mechanism with hydroxyl and amine functional groups. The particularity of this molecule is that it possesses multiple reactive sites (average number of 4.4) that are required to create a crosslinked network. The structure also shows the condensation by nucleophilic attack of a primary amine functional group onto the carbon next to the methoxy group.

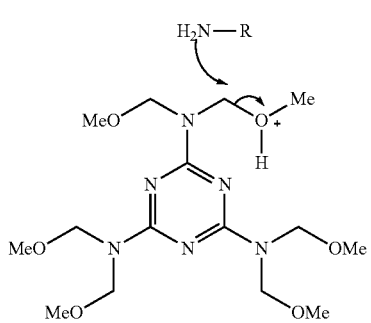

The reaction is further catalyzed by the introduction of an acid catalyst such as p-toluene sulfonic acid. The likely reaction mechanism is shown below.

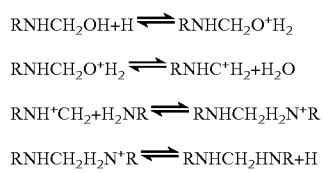

Several variants of the above formulation have been tested successfully. They include the use of alternative cross-linking agents as well as other catalysts.

TABLE 9B

| | Typical quantity (g) |
|---|---|
| HC99 polymer | 65 |
| CYMEL 303 | 5 |
| p-toluene sulfonic acid | 0.15 |

TABLE 9C

| | Typical quantity (g) |
|---|---|
| HC99 polymer | 65 |
| CYMEL 1170 | 5.53 |
| CYCAT 500 | 0.5 |

TABLE 9D

| | Typical quantity (g) |
|---|---|
| HC99 polymer | 65 |
| POWDERLINK 1174 | 3.14 |
| CYCAT 500 | 0.5 |

Example 22

Comparison of Fracture Resistance (Toughening) with Elastic Modulus

The benefit of using particles with a gradient interphase is demonstrated in neat resins by evaluating the fracture resistance using Linear Elastic Fracture Mechanics (following the procedure recommended by the ESIS committee, "Fracture Mechanics Testing Methods for Polymers Adhesives and Composites," D. R. Moore, A. Pavan, J. G. Williams, ESIS publication 28, 2001, pp 11-26). Neat resin samples (without fibers) are prepared by conventional hot-mixing techniques and cast into moulds for curing. $K_{IC}$ and $G_{IC}$ are measured on the neat resin using LEFM, elastic modulus is determined by compliance measurements.

The resins evaluated are detailed below:

TABLE 10A

| | Control 1 |
|---|---|
| MY0510 | 60% equivalent |
| PY306 | 40% equivalent |
| 44DDS | 80% equivalent |
| HC99 | 0% |
| PILT-100 | 0% |

TABLE 10B

| | Control 2 |
|---|---|
| MY0510 | 60% equivalent |
| PY306 | 40% equivalent |
| 44DDS | 80% equivalent |
| HC99 | 30% |
| PILT-100 | 0% |

TABLE 10C

| | 077-039B |
|---|---|
| MY0510 | 60% equivalent |
| PY306 | 40% equivalent |
| 44DDS | 80% equivalent |
| HC99 | 15% |
| PILT-100 | 15% |

In the above Tables, MY 0510 is triglycidyl p-aminophenol TGAP (ARALDITE MY 0510) available from Huntsman, The Woodlands, Tex. PY306 is bisphenol F-based epoxy resin (ARALDITE PY306) available from Huntsman, The Woodlands, Tex. 44DDS is 4,4'-diaminodiphenyl sulfone. HC99 is an amine terminated PES-PEES copolymer (available from Cytec Engineered Materials). PILT-100 is the denomination of cross-linked particles produced according to the recipes described in this invention.

TABLE 10D

| | $K_{IC}$ (Mpa·m$^{0.5}$) | Kc std dev | $G_{IC}$ (kJ/m$^2$) | E (GPa) |
|---|---|---|---|---|
| Control 1 | 0.52 | 0.02 | 0.07 | 3.62 |
| Control 2 | 0.84 | 0.02 | 0.1999 | 3.48 |
| 077-039B | 1.01 | 0.01 | 0.309 | 3.53 |

Table 9D above shows that particles toughen the matrix without sacrificing the elastic modulus of the resin.

Example 23

Particle Stiffness

Figure 3:
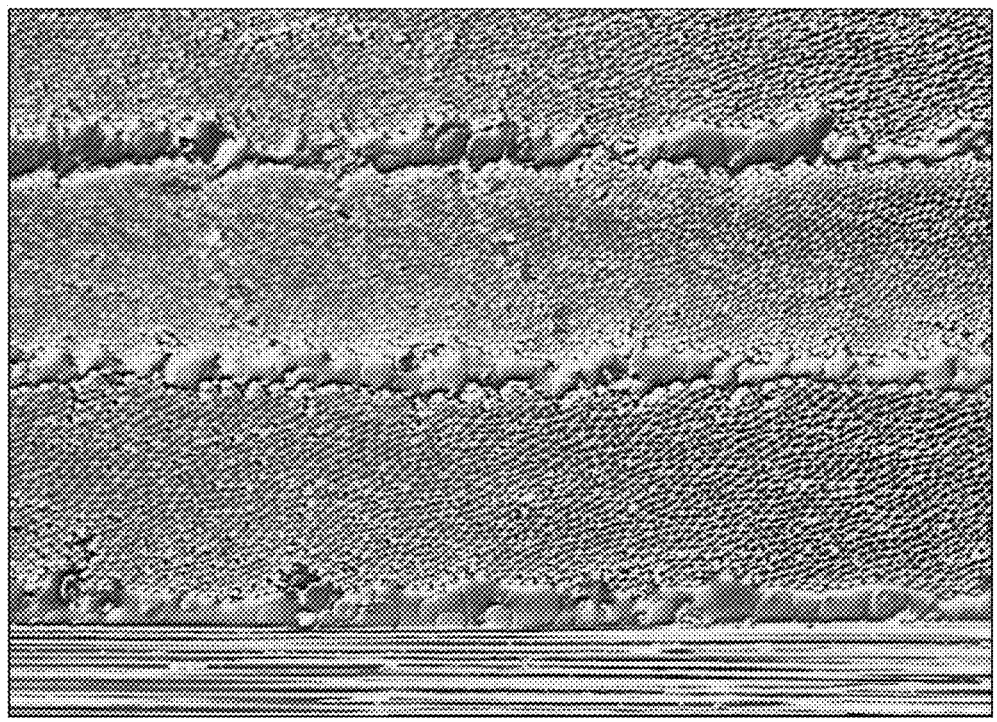
FIG. 3 illustrates an interlaminar gap created and maintained by particles, which retain sufficient stiffness, including when they are swollen by the surrounding thermosetting resin. Particles are visible in the resin rich areas, which divide the carbon fiber rich plies.

The level of crosslinking of the particles also ensures that the particles retain sufficient stiffness, including when they are swollen by the surrounding thermosetting resin, so that they are able to create and maintain an interlaminar gap. This behavior is illustrated in FIG. 3. Particles are visible in the resin rich areas, which divide the carbon fiber rich plies.

Example 24

Compression After Impact (CAI) and Fracture Toughness ($G_{IIC}$) Measurements

Typical composite formulations are illustrated below. The examples below show the difference in behavior between cross-linked particles PILT-100 and standard PPO (polyphenylene oxide) particles, and rubbery DP5045 (cross-linked carboxy-functional elastomer) particles (from Zeon Chemicals) in two different formulations.

TABLE 11A

| R11F3 | |
|---|---|
| Carbon Fiber | T40-800 |
| MY721 | 50% equivalent |
| MY0600 | 50% equivalent |
| 33DDS | 100% equivalent |
| PES 5003P | 20% |
| PILT-100 | 10% |

TABLE 11B

| Control 1 R11F4 | |
|---|---|
| Carbon Fiber | T40-800 |
| MY721 | 50% equivalent |
| MY0600 | 50% equivalent |
| 33DDS | 100% equivalent |
| PES 5003P | 20% |
| PPO | 10% |

TABLE 11C

| Control 2 R10F1 | |
|---|---|
| Carbon Fibre | T40-800 |
| MY721 | 50% equivalent |
| MY0610 | 50% equivalent |
| 33DDS | 100% equivalent |
| PES 5003P | 20% |
| DP5045 | 5% |

TABLE 11D

| R11F11 | |
|---|---|
| Carbon Fiber | T40-800 |
| MY721 | 40% equivalent |
| MY0600 | 20% equivalent |
| PY306 | 40% equivalent |
| 33DDS | 100% equivalent |
| PES 5003P | 20% |
| PILT-100 | 10% |

TABLE 11E

| Control 1 R11F12 | |
|---|---|
| Carbon Fiber | T40-800 |
| MY721 | 40% equivalent |
| MY0610 | 20% equivalent |
| PY306 | 40% equivalent |
| 33DDS | 100% equivalent |
| PES 5003P | 20% |
| PPO | 10.0% |

TABLE 11F

| Control 2 R10F2 | |
|---|---|
| Carbon Fibre | T40-800 |
| MY721 | 40% equivalent |
| MY0610 | 20% equivalent |

TABLE 11F-continued

| Control 2 R10F2 | |
|---|---|
| PY306 | 40% equivalent |
| 33DDS | 100% equivalent |
| PES 5003P | 20% |
| DP5045 | 5.0% |

TABLE 11G

| | CAI [ksi] |
|---|---|
| R11F3 | 42.17 |
| R11F4 | 40.94 |
| R10F1 | 43.5 |
| R11F11 | 43.95 |
| R11F12 | 43.86 |
| R10F2 | 41.6 |

TABLE 11H

| | $G_{IIC}$ [$1^{st}$ crack] in-lb/in$^2$ |
|---|---|
| R11F3 | 10.59 |
| R11F4 | 9.74 |
| R10F1 | 4.1 |
| R11F11 | 12.15 |
| R11F12 | 11.78 |
| R10F2 | 7.3 |

TABLE 11I

| | In-Plane Shear Modulus (IPSM) | | |
|---|---|---|---|
| | Amb. | MEK | % Loss |
| R11F3 | 0.712 | 0.686 | 4% |
| R11F4 | 0.745 | 0.703 | 6% |
| R10F1 | | | 4% |
| R11F11 | 0.66 | 0.608 | 8% |
| R11F12 | 0.668 | 0.633 | 5% |
| R10F2 | | | 11% |

In the above Tables, MY721 is tetraglycidyldiaminodiphenylmethane TGDDM (ARALDITE MY721) available from Ciba Geigy Corporation, Hawthorne, N.Y. MY0610 is 3-glycidyloxy-N, N-diglycidyl aniline or Triglycidyl m-aminophenol (ARALDITE MY0610) available from Ciba Geigy Corporation, Hawthorne, N.Y. 33DDS is 3,3'-diaminodiphenyl sulfone. PES 5003P is phenol-terminated PES (5003P) available from Sumitomo Chemical Co. Ltd. (Osaka, Japan). PPO is polyphenylene oxide thermoplastic particle (available from Sabic Innovative Plastics).

The fracture properties (CAI and $G_{IIC}$) indicate the value of the compatible cross-linked particles in controlling the initiation and propagation of cracks in the composite.

Figure 6A:
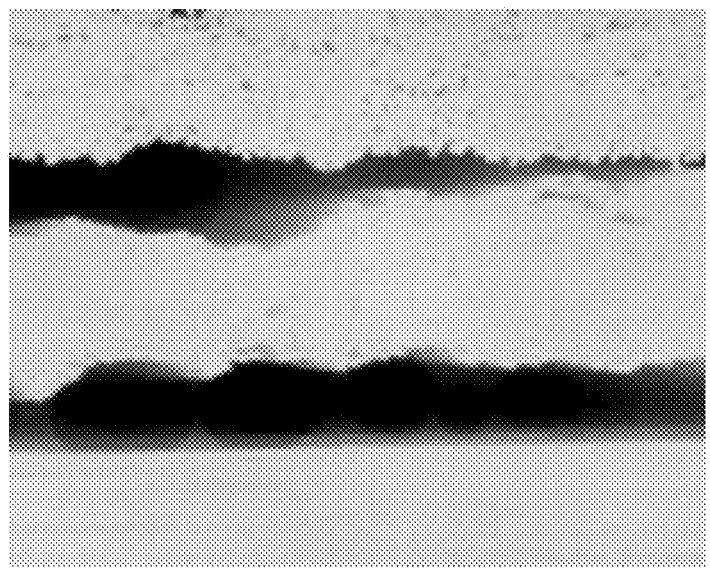
FIGS. 6A-B show composite interlaminar regions after solvent resistance testing under strain; microcracks are revealed by using fluorescent dyes.
Figure 6B:
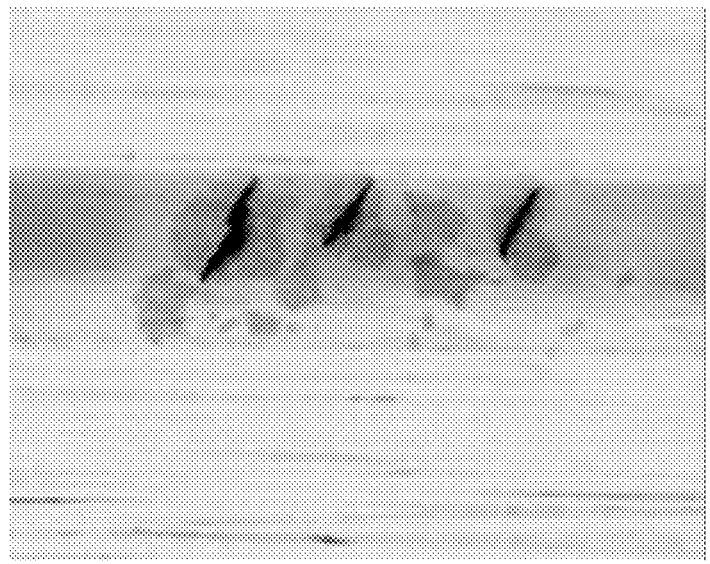

More importantly, the chemical and mechanical resistance of the engineered particles clearly outperforms the existing thermoplastics. This result is exacerbated on specimens that are tested for solvent sensitivity under strain. As illustrated by FIGS. 6A and B, the regular PPO thermoplastic particles start developing microcracks whilst the cross-linked compatible particles show a much higher resistance to microcracking The compatibility of the particle with the matrix resin ensures a gradual stress build-up at the interface between the particles and the matrix, which controls the stress concentration at the interface of the particles. A sharp and abrupt interface found in conventional materials often leads to premature debonding of the particles, which subsequently can evolve into microcracks and early fracture of the material. In addition, the cross-linked nature of the polymer that is forming the particles significantly increases their toughness and their resistance to microcracking and crazing.

Various patent and/or scientific literature references have been referred to throughout this application. The disclosures of these publications in their entireties are hereby incorporated by reference as if written herein to the extent that such disclosures are not inconsistent with the invention and for all jurisdictions in which such incorporation by reference is permitted. In view of the above description and the examples, one of ordinary skill in the art will be able to practice the disclosure as claimed without undue experimentation.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A method of manufacturing engineered cross-linked particles comprising:
   a) dissolving a thermoplastic polymer, one or more compounds having one or more reactive groups, and a cross-linking agent capable of polymerizing the one or more compounds via the one or more reactive groups in a solvent to form a solution;
   b) forming an emulsion by mixing the solution of step (a) with a second solution in the presence of one or more stabilizers, said second solution being immiscible to that formed in step (a);
   c) stripping said solvent out of the emulsion of step (b), thereby forming a plurality of solid particles; and
   d) curing the solid particles, wherein, after curing, each cured solid particle comprises an inter-penetrating polymer network.

2. The method according to claim 1, wherein the curing step is performed by using heat, radiation, electron beam, or UV light.

3. The method according to claim 1, wherein the thermoplastic polymer is selected from the group consisting of: polycarbonate; polyetherimide; polyamide; polyimide; polysulfone; polyethersulfone; polyphenylene oxide; polyether ketones; styrene-butadiene; polyacrylates; polyacetal; polybutyleneterephthalate; polyamide-imide; polyhydroxyethers; polyphenyl sulfides; polysiloxanes; copolymers thereof; and combinations thereof.

4. The method according to claim 1, wherein the reactive groups of the one or more compounds are selected from the group consisting of: amine; epoxy; hydroxyl; carboxylic acid; anhydride; glycidyl; chloride; isocyanate; nadimide; acetylene; maleimide; vinyl; vinyl ester; cyanate ester; diene; and phenolic.

5. The method according to claim 1, wherein the cross-linking agent is selected from the group consisting of: vinyl terminated styrene-butadiene-rubber; alkylated melamine derivatives; acid chlorides; multi-functional epoxies; carboxylic acids; and combinations thereof.

6. The method according to claim 1, wherein said solvent is selected from the group consisting of: dichloromethane, chloroform, methanol, toluene, and combinations thereof, and wherein said second solution is water.

7. The method according to claim 1, wherein said stabilizer is selected from the group consisting of: ionic surfactants; non-ionic surfactants; and combinations thereof.

8. The method according to claim 1, wherein the stabilizer is selected from the group consisting of: polyvinyl alcohol, hydroxycellulose; hydroxymethylcellulose; and hydroxyethylcellulose.

9. The method according to claim 1, wherein the solvent is stripped via gas, distillation, or vacuum.

10. The method according to claim 1, wherein the curing step is performed at a temperature between 20° C. to 300° C. for a period of 1 to 48 hours.

11. The method according to claim 1, wherein step (a) further includes dissolving a catalyst in the solvent.

* * * * *